(12) United States Patent
Hirai et al.

(10) Patent No.: US 6,556,788 B2
(45) Date of Patent: Apr. 29, 2003

(54) PHOTOMETRY DEVICE

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/731,715

(22) Filed: Dec. 8, 2000

(65) Prior Publication Data

US 2001/0003557 A1 Jun. 14, 2001

(30) Foreign Application Priority Data

Dec. 9, 1999 (JP) .............................. 11-349984
Aug. 3, 2000 (JP) ........................ 2000-235356

(51) Int. Cl.[7] .................................................. G03B 7/00
(52) U.S. Cl. ...................... 396/121; 396/225; 396/234
(58) Field of Search ........................... 396/225, 65, 67, 396/121, 122, 123, 233, 234

(56) References Cited

U.S. PATENT DOCUMENTS

| 5,289,225 A | 2/1994 | Hirai | 396/122 |
| 5,596,387 A | 1/1997 | Takagi | 396/225 X |
| 5,710,948 A | 1/1998 | Takagi | 396/225 X |
| 5,937,221 A | 8/1999 | Yamamoto et al. | 396/225 X |
| 5,987,265 A | 11/1999 | Iwasaki | 396/225 |
| 6,014,525 A | 1/2000 | Ohkura et al. | 396/234 |
| 6,175,693 B1 * | 1/2001 | Iida | 396/121 |

FOREIGN PATENT DOCUMENTS

| JP | 6-281994 | 10/1994 | G03B/7/28 |
| JP | 7-84299 | 3/1995 | G03B/7/28 |

* cited by examiner

Primary Examiner—W. B. Perkey
(74) Attorney, Agent, or Firm—Greenblum & Bernstein, P.L.C.

(57) ABSTRACT

A photometry device for a camera has a normal light metering system and a plurality of light metering systems having different spectral sensitivity characteristics. An exposure amount of an object is determined in accordance with an output of the normal light metering system. A colormetry system divides a photometry area into a plurality of areas and judges a color of the object at each of the plurality of areas. The compensation amount determining system determines the exposure compensation amounts respectively corresponding to the plurality of areas based on the color thereat. A compensation amount related to an area corresponding to a focused portion of the object. The exposure amount is compensated in accordance with the determined exposure compensation amount.

13 Claims, 20 Drawing Sheets

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.17

(EEPROM)

| COLOR | COMPENSATION VALUE |
|-------|--------------------|
| Y | −8 |
| M | 0 |
| C | 0 |
| B | +6 |
| G | 0 |
| R | +2 |

FIG.21

PHOTOMETRY DEVICE

BACKGROUND OF THE INVENTION

The present invention relates to a photometry device applicable to a SLR (Single Lens Reflex) camera, and more particularly to a photometry device with which exposure errors due to a difference of reflectivity of objects having different colors can be compensated.

Recently, in most of cameras, reflection type photometry devices are employed. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the brightness is measured as greater than the actual brightness. If the camera controls an exposure operation based on thus determined exposure value, the object is under exposed. A dark object whose reflectivity is less than 18% is measured to have a lower brightness. Therefore, such an object is overexposed. The difference of the reflectivity of the object may also occur depending on the color of the object. For example, when the color of an object is yellow, the reflectivity may be up to 70%. In such a case, if the standard exposure value is for the object whose reflectivity is 18%, the exposure value is approximately 2 Ev lower than necessary. If the object color is blue, the reflectivity is approximately 9%. In this case, the object is over exposed by approximately 1% greater than necessary.

Therefore, in the conventional photometry device, photographer should guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, to guess the reflectivity of the object and control the exposure can be done by only experienced and skilled photographers. It is impossible to require all the photographers to do such an operation. Further, it is not preferable that a manual operation of the photographer is required for exposure. Further, if such a manual operation is required, cameras become unsuitable for recent trend of the automatic photographing.

SUMMARY OF THE INVENTION

It is therefore an object of the invention to provide an improved photometry device with which appropriate exposure values can be obtained regardless of difference of reflectivity of focused objects.

For the above object, according to the invention, there is provided a photometry device for a camera, which is provided with a normal light metering system having spectral sensitivity characteristics close to visual sensitivity characteristics, a plurality of light metering system shaving spectral sensitivity characteristics that are different from those of the normal light metering system, an exposure amount determining system that determines an exposure amount of an object in accordance with an output of the normal light metering system, a colorimetry system that judges a color of the object in accordance with the outputs of the plurality of light metering systems, a compensation amount determining system that determines an exposure compensation amount in accordance with the color judged by the colorimetry system. The colorimetry system divides the photometry area into a plurality of areas and performing colorimetry for each of the plurality of areas, and the compensation amount determining system determines the exposure compensation amounts respectively corresponding to the plurality of areas, one of the plurality of compensation amounts being selected in accordance with at least one of the plurality of areas corresponding to a focused portion of the object, and a controller that compensates for the exposure amount determined by the exposure amount determining system in accordance with the determined exposure compensation amount.

With the above configuration, an appropriate exposure values can be obtained regardless of difference of reflectivity of focused objects.

Optionally, the camera may include a distance measuring system that detects distances of object at a plurality of distance measuring points corresponding to the divided plurality of areas of the photometry area, and a focusing system that focuses on one of the plurality of distance measuring points. In such a camera, the compensation amount determining system selects the exposure compensation amount corresponding to an area in the divided areas of the photometry area including at least on of the plurality of distance measuring point.

Optionally, the plurality of light metering systems are arranged on an eyepiece optical system side of a pentagonal prism of an single lens reflex camera. A photometry area of each of the plurality of light metering system covers a photographing angle of view of the single lens reflex camera. Further, the plurality of distance measuring points are arranged inside the photographing angle of view of the single lens reflex camera.

In the above case, at least one of the divided areas of the photometry area may include one of the plurality of distance measuring points.

Still optionally, the photometry device may be configured such that, the camera is provided with a distance measuring system that detects distances of object at a plurality of distance measuring points respectively corresponding to the divided areas of the photometry area, and a focusing system that focuses on one of the plurality of distance measuring points. The compensation amount determining system may determine an entire exposure compensation amount based on at least one of the weighted exposure compensation amounts corresponding to at least one of the divided areas of the photometry area close to one of the distance measuring points and other exposure compensation amounts corresponding to other divided areas.

Optionally, the compensation amount determining system determines the entire exposure compensation amount by averaging the weighted exposure compensation amounts and the other exposure compensation amounts.

Further optionally, at least one of the divided areas of the photometry area includes at least one of the plurality of distance measuring points.

Further optionally, the colorimetric system may include a blue light photometry sensor that meters blue light, a green light photometry sensor that meters green light, and a red light photometry sensor that meters red light.

Still optionally, the colorimetry system may judge at least yellow, blue and red from among yellow, magenta, cyan, blue, green and red, in accordance with the outputs of the plurality of photometry sensors, and the compensation amount determining system determines the exposure compensation amount in an over exposure side if the colorimetry system judges the color is yellow, and wherein the compensation amount determining system determines the exposure compensation amount in an under exposure side if the colorimetry system judges the color is blue or red.

In such a case, the compensation amount determining system may determine the compensation amount is zero if the colorimetry system judges the color is magenta, cyan or green.

BRIEF DESCRIPTION OF THE ACCOMPANYING DRAWINGS

FIG. 1 shows a perspective view of a camera employing a photometry device according to the invention;

FIG. 2 schematically shows main components of the camera;

Figure 4A:
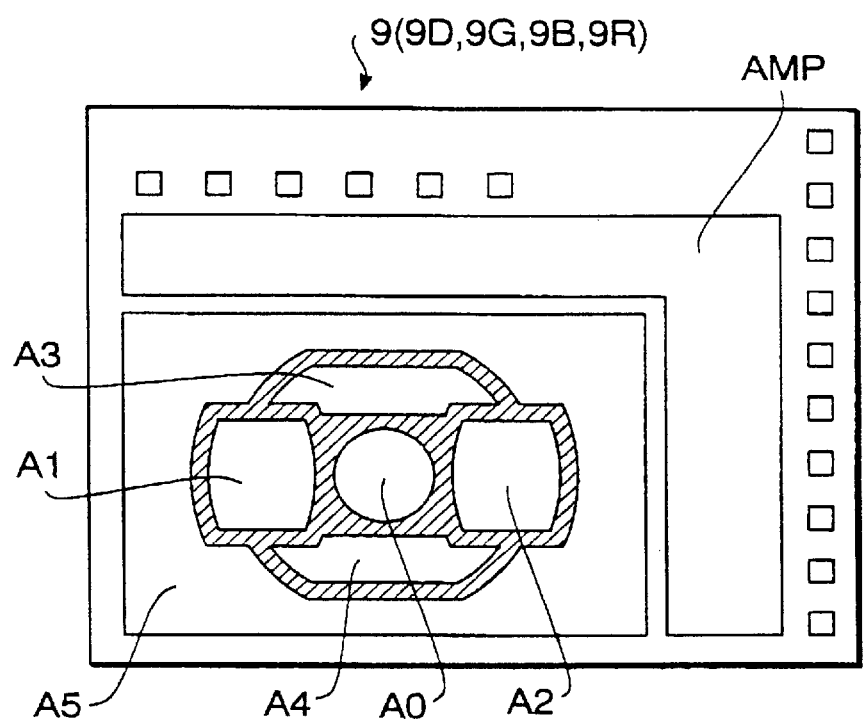
Figure 4B:
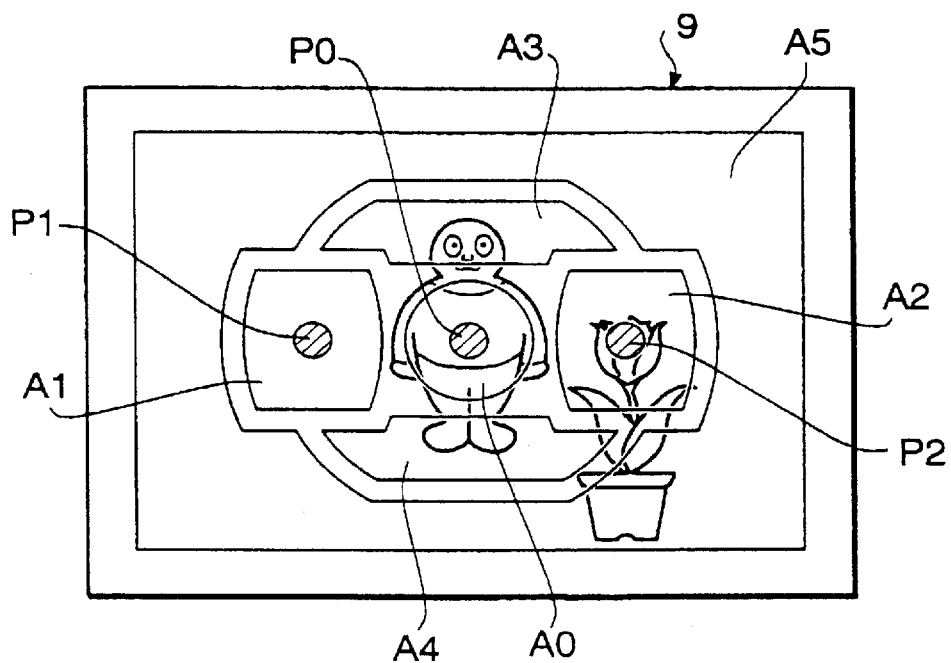
Figure 5:
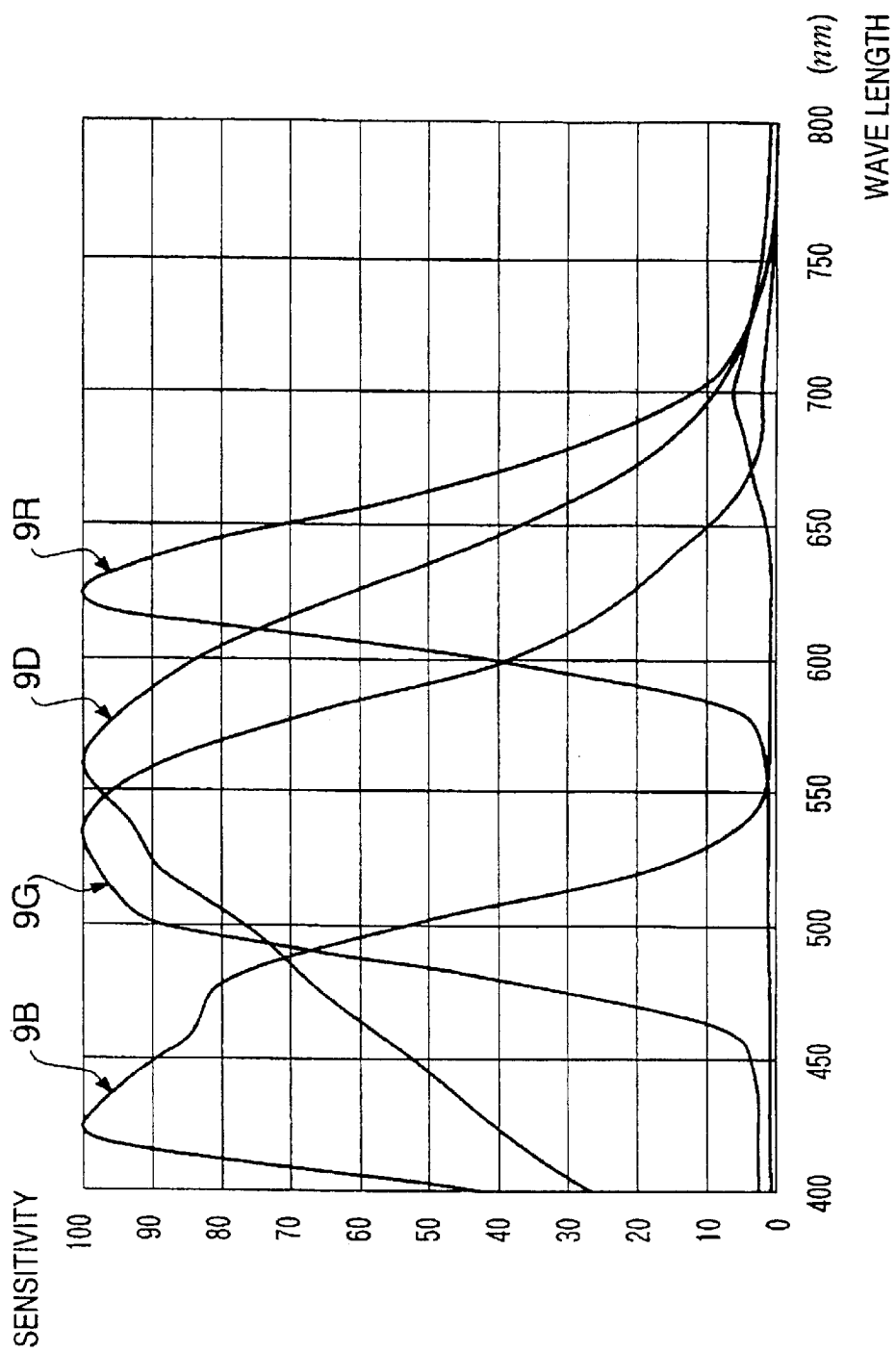
Figure 6:
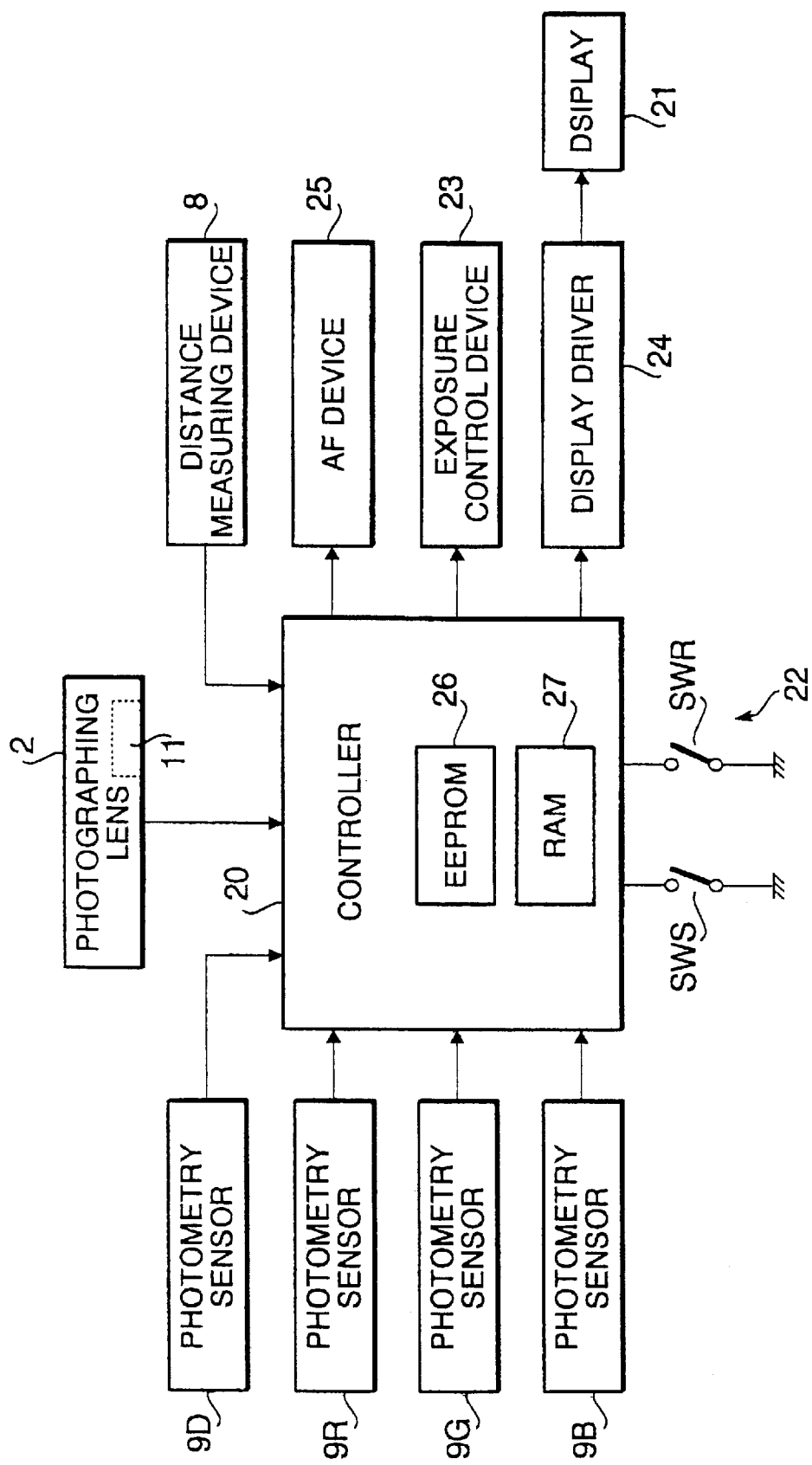
Figure 7:
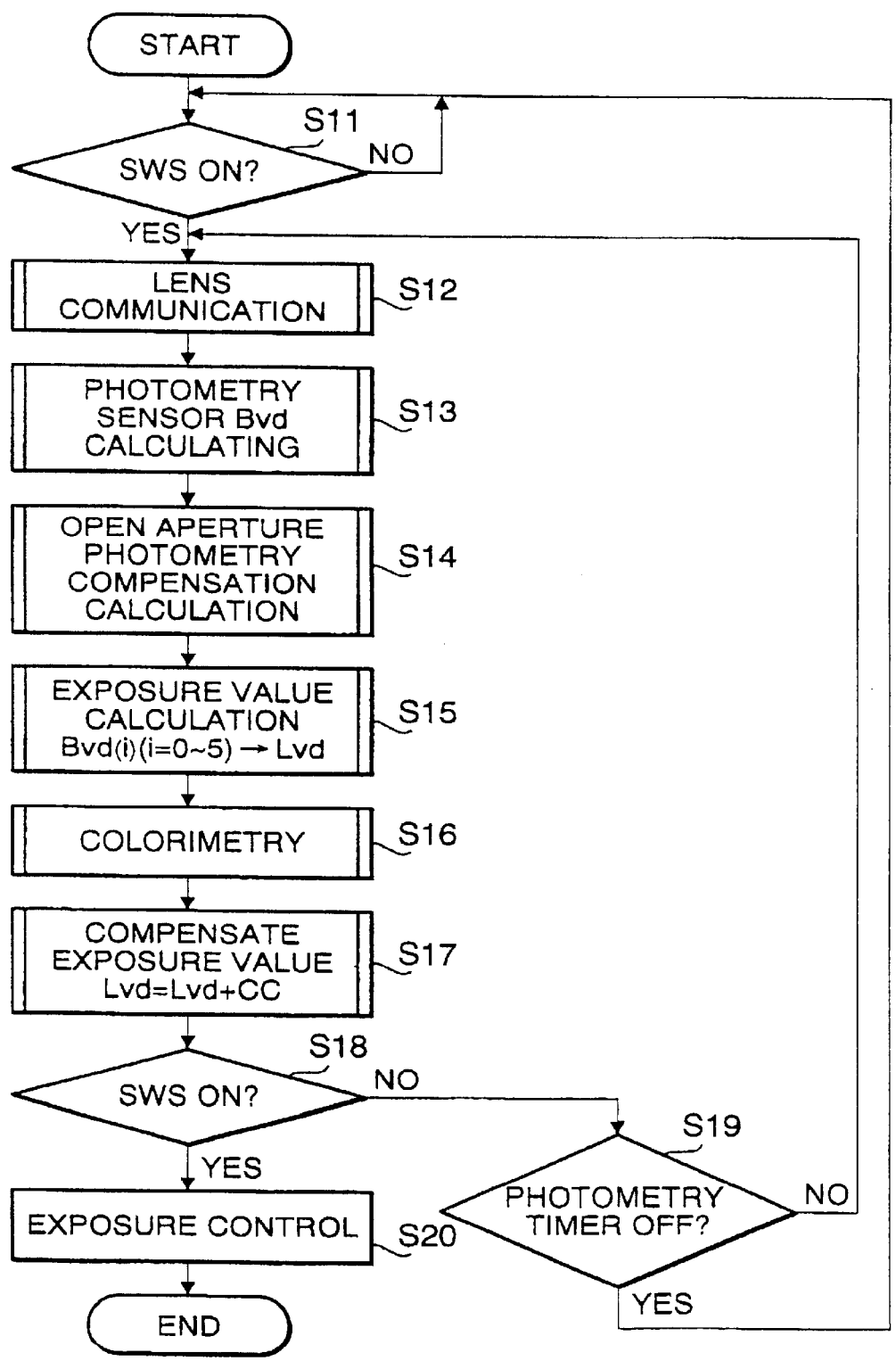
Figure 8:
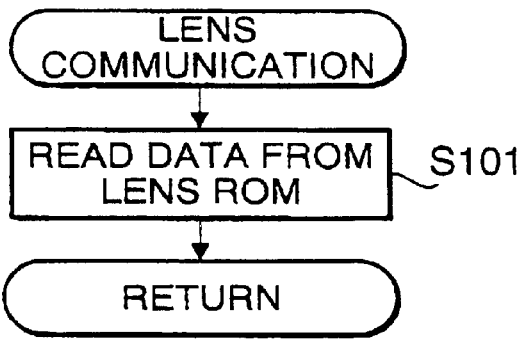
Figure 9:
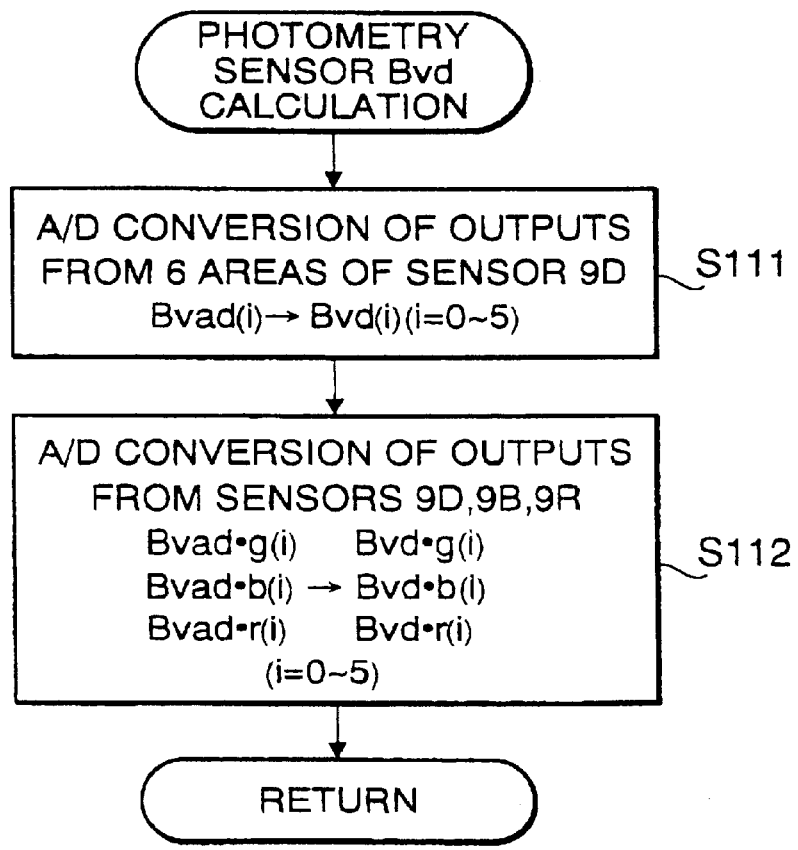
Figure 10:
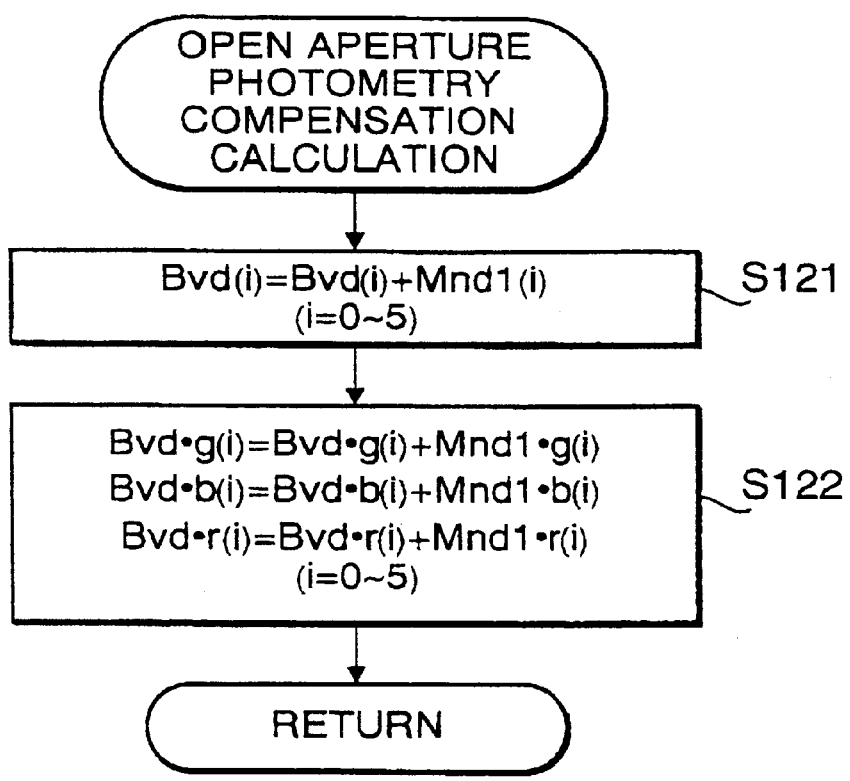
Figure 11:
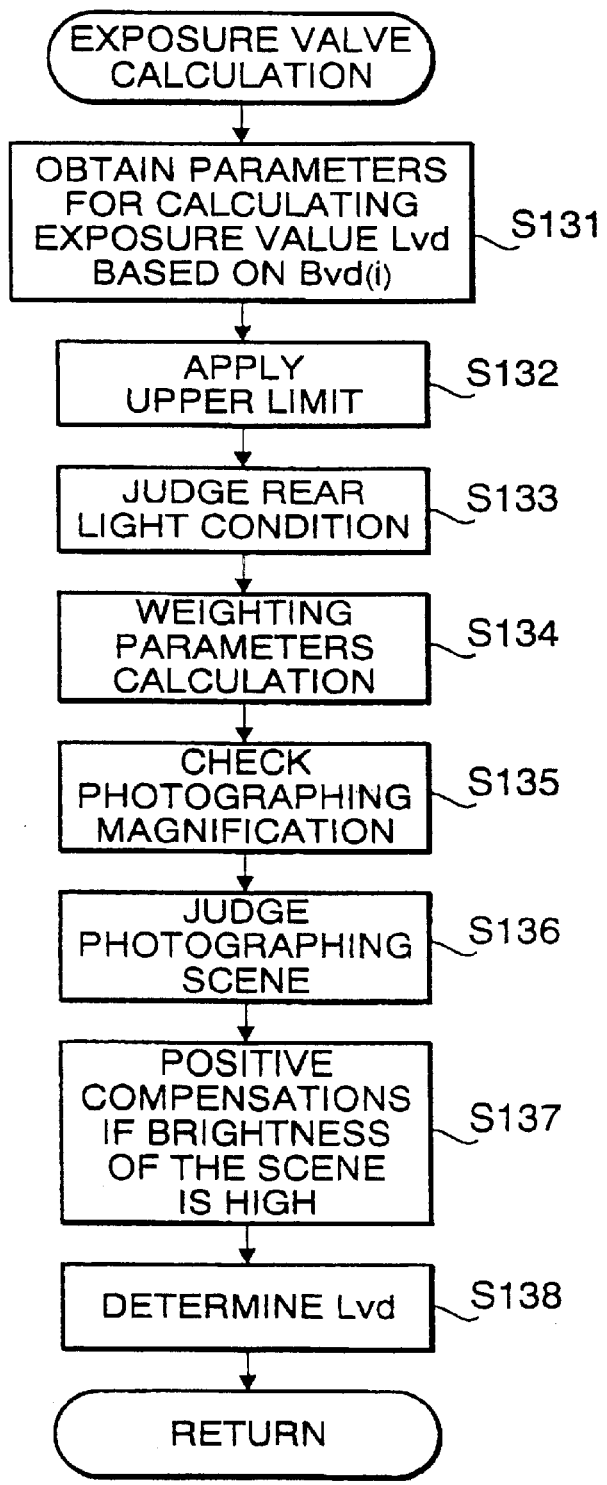
Figure 12:
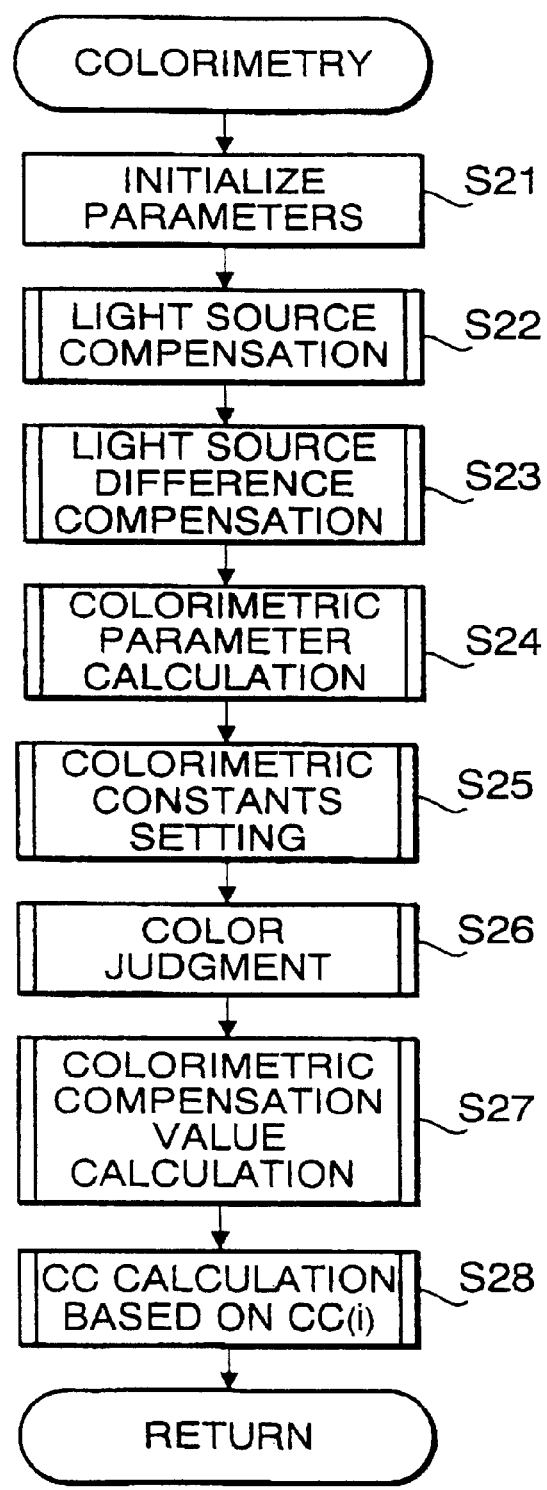
Figure 13:
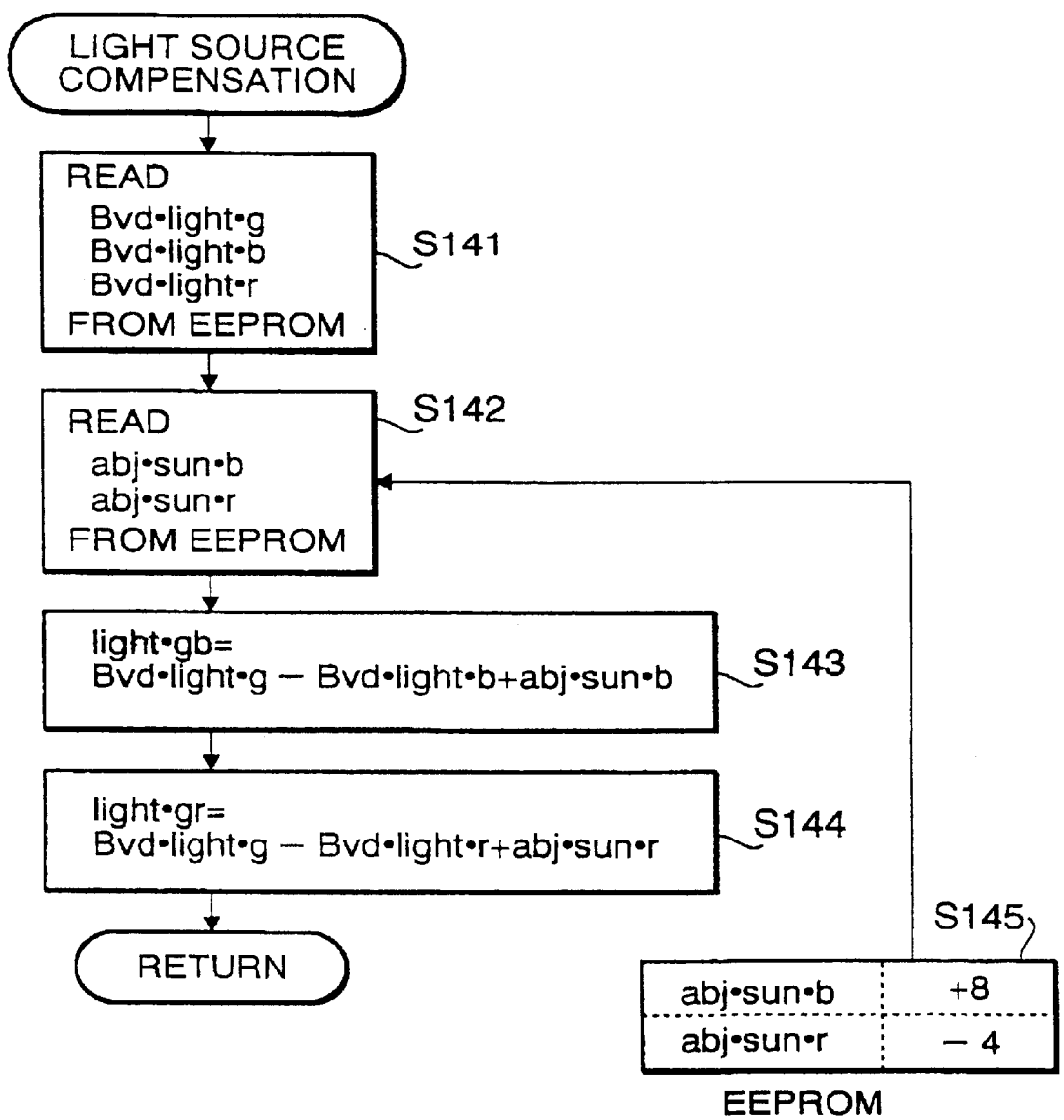
Figure 14:
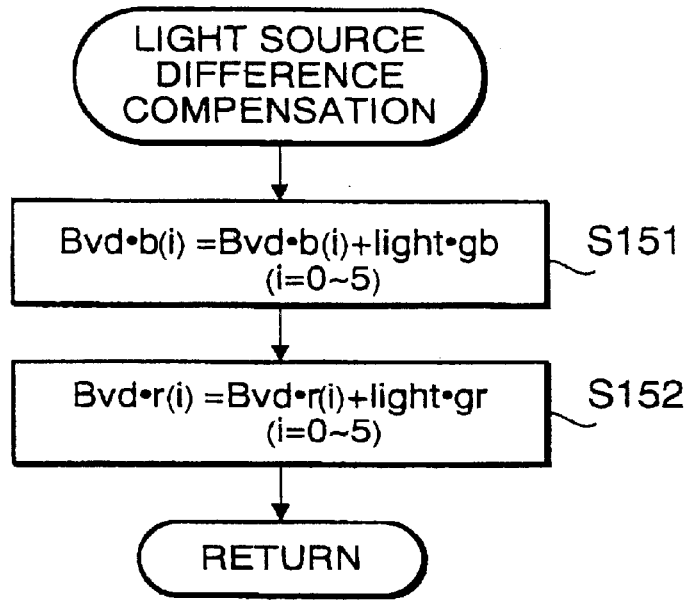
Figure 15:
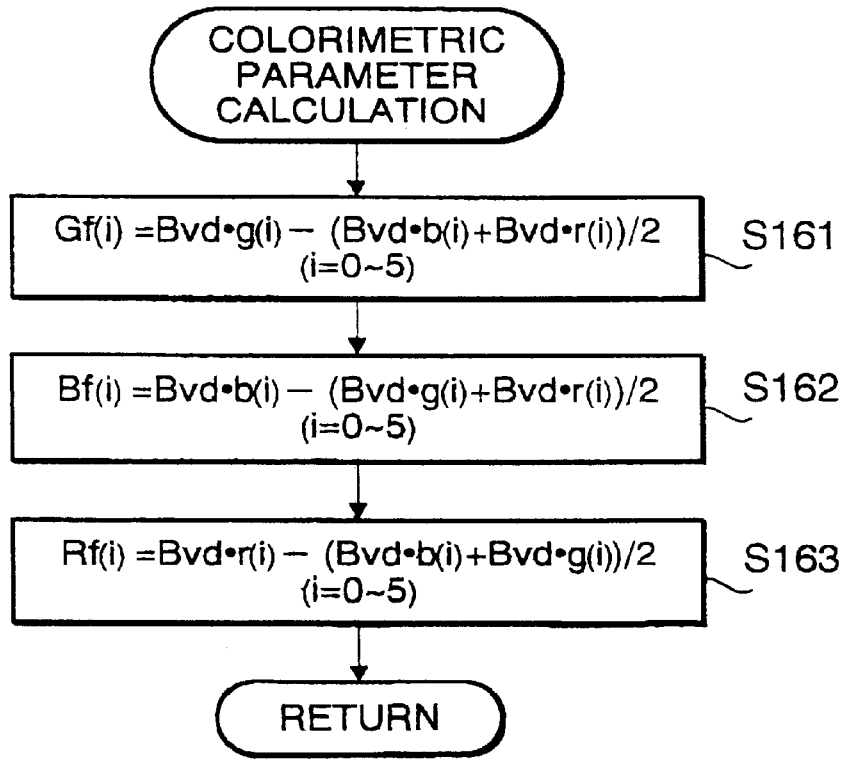
Figure 16:
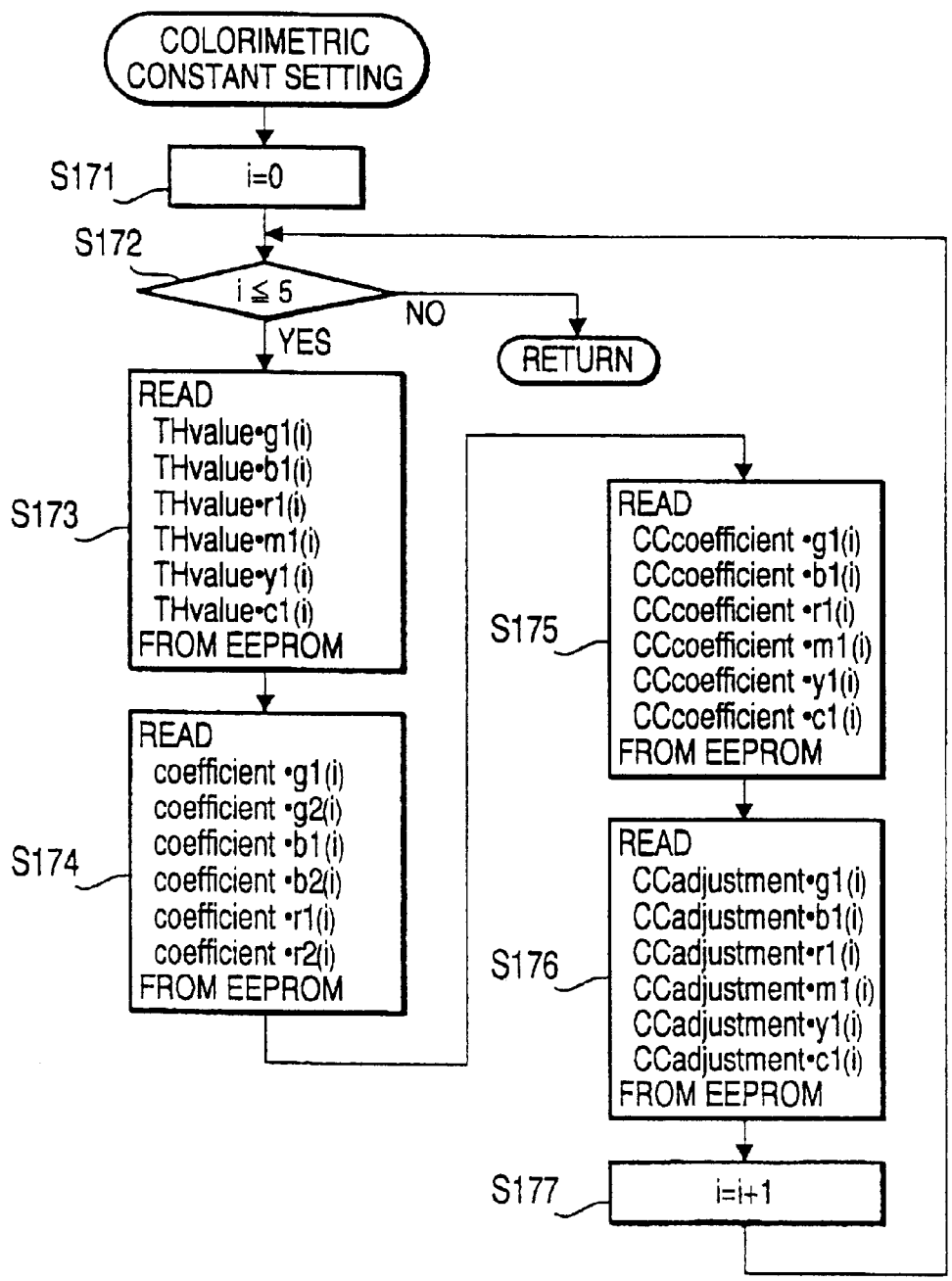
Figure 18:
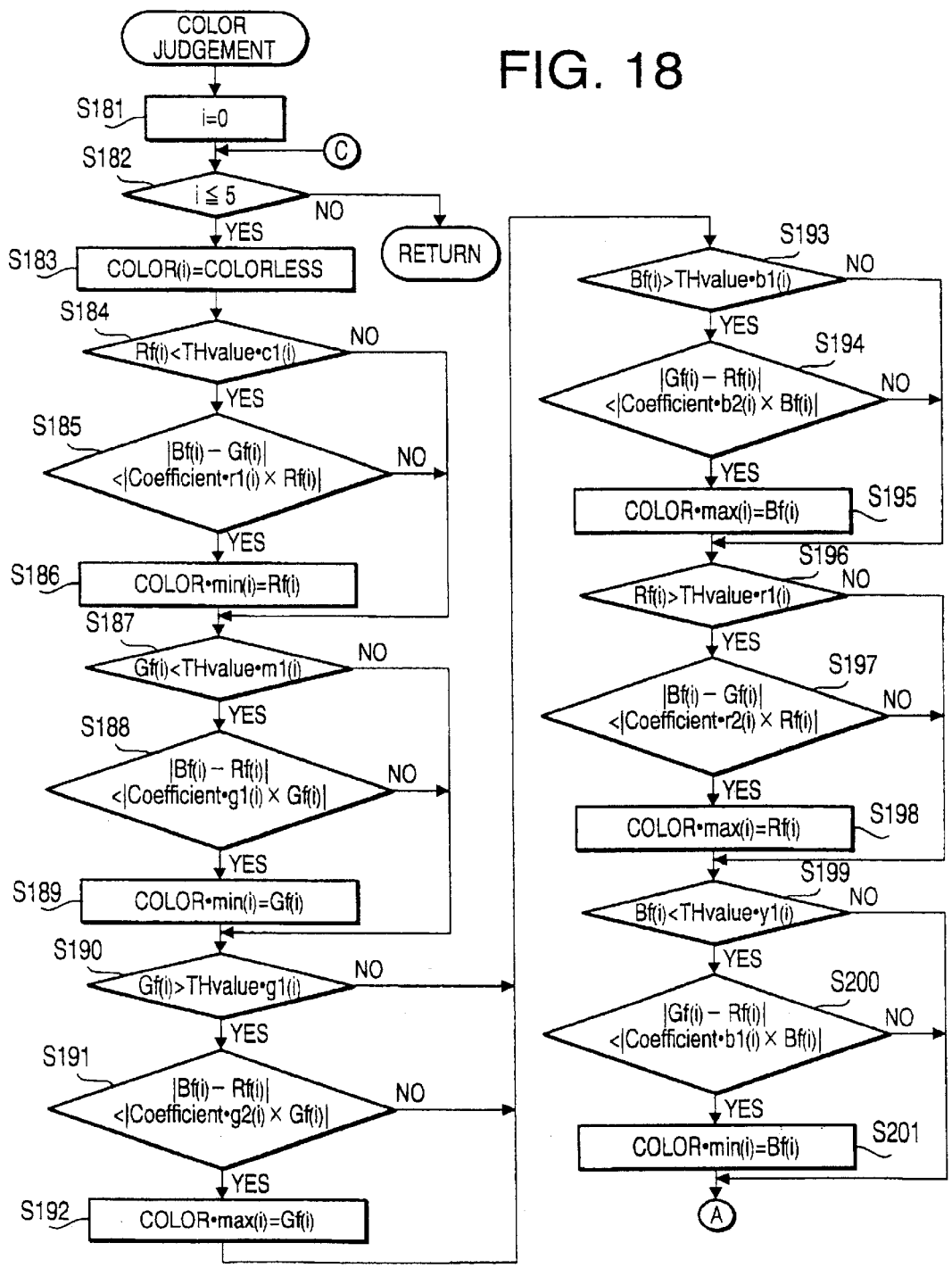
Figure 19:
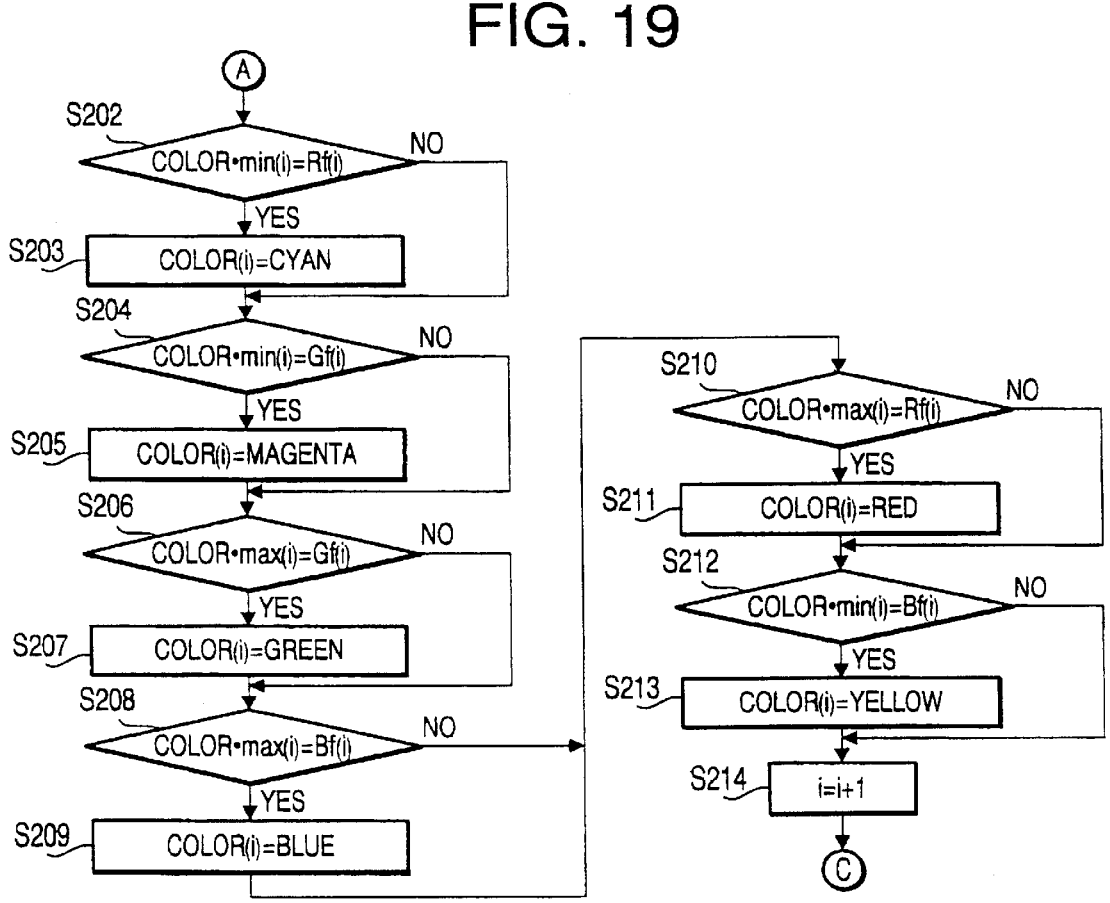
Figure 20:
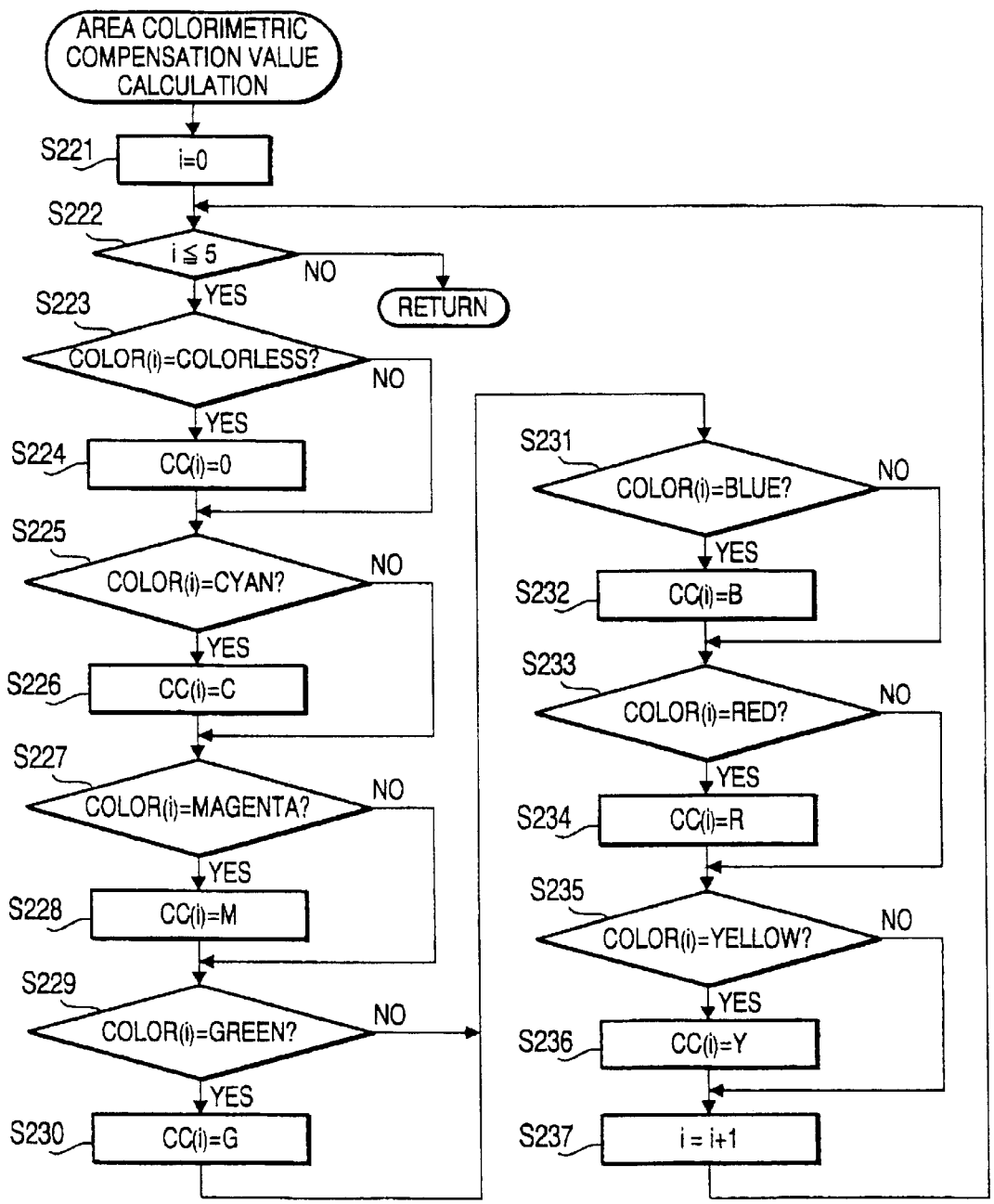
Figure 22:
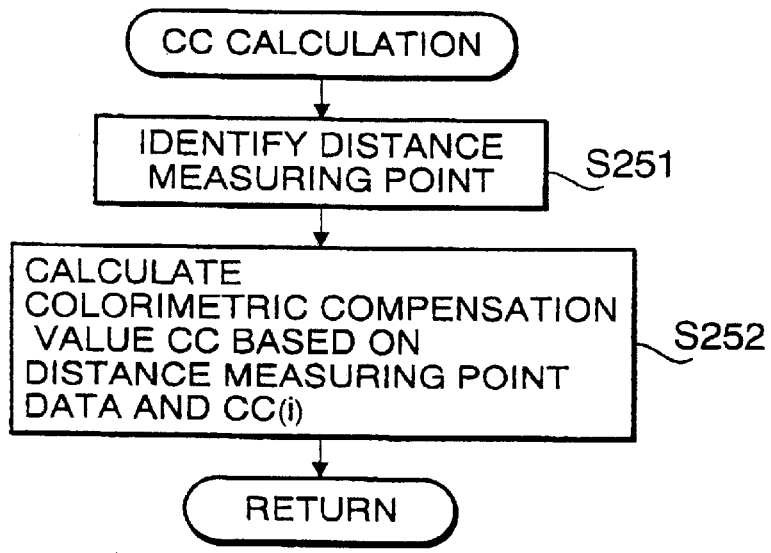
Figure 23:
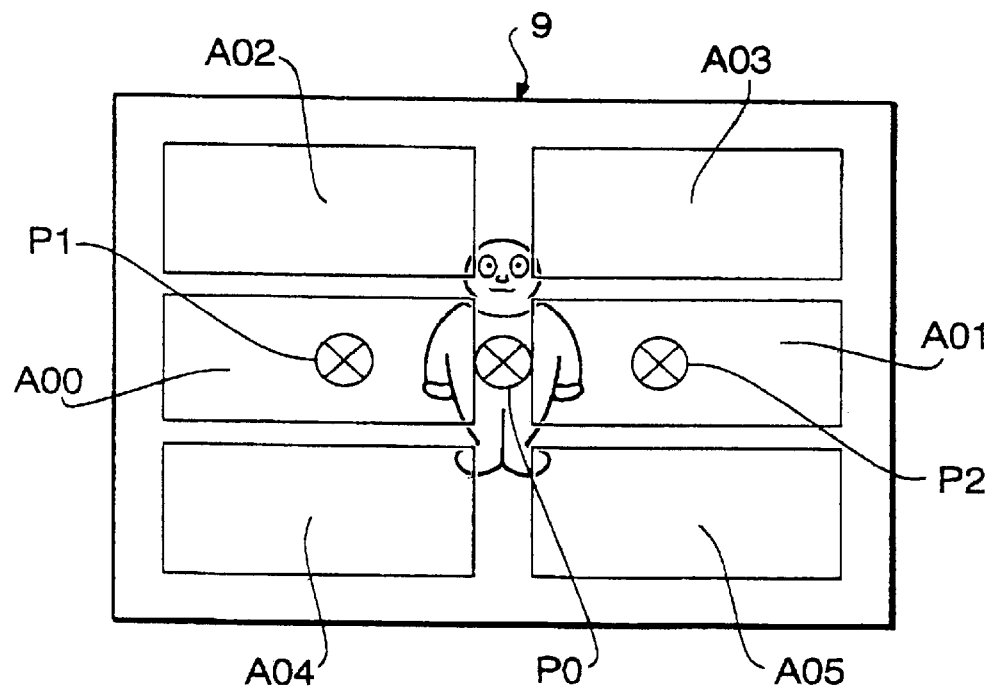

FIG. 4A schematically shows a structure of each of the photometry sensors;

FIG. 4B shows a relationship between the photometry areas and distance measuring points;

FIG. 5 shows spectral sensitivity characteristics of the green, blue and red filters;

FIG. 6 shows a block diagram of main portions of the camera;

FIG. 7 is a flowchart illustrating a main procedure of a photometry operation according to a first embodiment;

FIG. 8 is a flowchart illustrating the "lens communication procedure";

FIG. 9 shows a flowchart illustrating the "photometry sensor Bvd calculation procedure";

FIG. 10 is a flowchart illustrating the "open aperture photometry compensation calculation procedure";

FIG. 11 is a flowchart illustrating an "exposure value calculating procedure";

FIG. 12 is a flowchart illustrating a "colorimetry procedure";

FIG. 13 is a flowchart illustrating the "light source compensation procedure";

FIG. 14 is a flowchart illustrating the "light source difference compensation procedure";

FIG. 15 is a flowchart illustrating the "calorimetric parameter calculation procedure";

FIG. 16 is a flowchart illustrating the "colorimetric constant setting procedure";

FIG. 17 shows an example of constants read from the EEPROM;

FIGS. 18 and 19 show a flowchart illustrating the "color judgment procedure";

FIG. 20 is a flowchart illustrating an example of the "area colorimetric compensation value calculating procedure";

FIG. 21 shows a table in which the relationship between the compensation value CC(i) determined in the procedure shown in FIG. 20 and the actual compensation values;

FIG. 22 is a flowchart illustrating a "CC calculating procedure", which is called at S28 of the colorimetry procedure in FIG. 12; and FIG. 23 shows an alternative arrangement of the photometry areas and distance measuring points.

DESCRIPTION OF THE EMBODIMENTS

Hereinafter, referring to the accompanying drawings, embodiments according to the present invention will be described.

Figure 1:
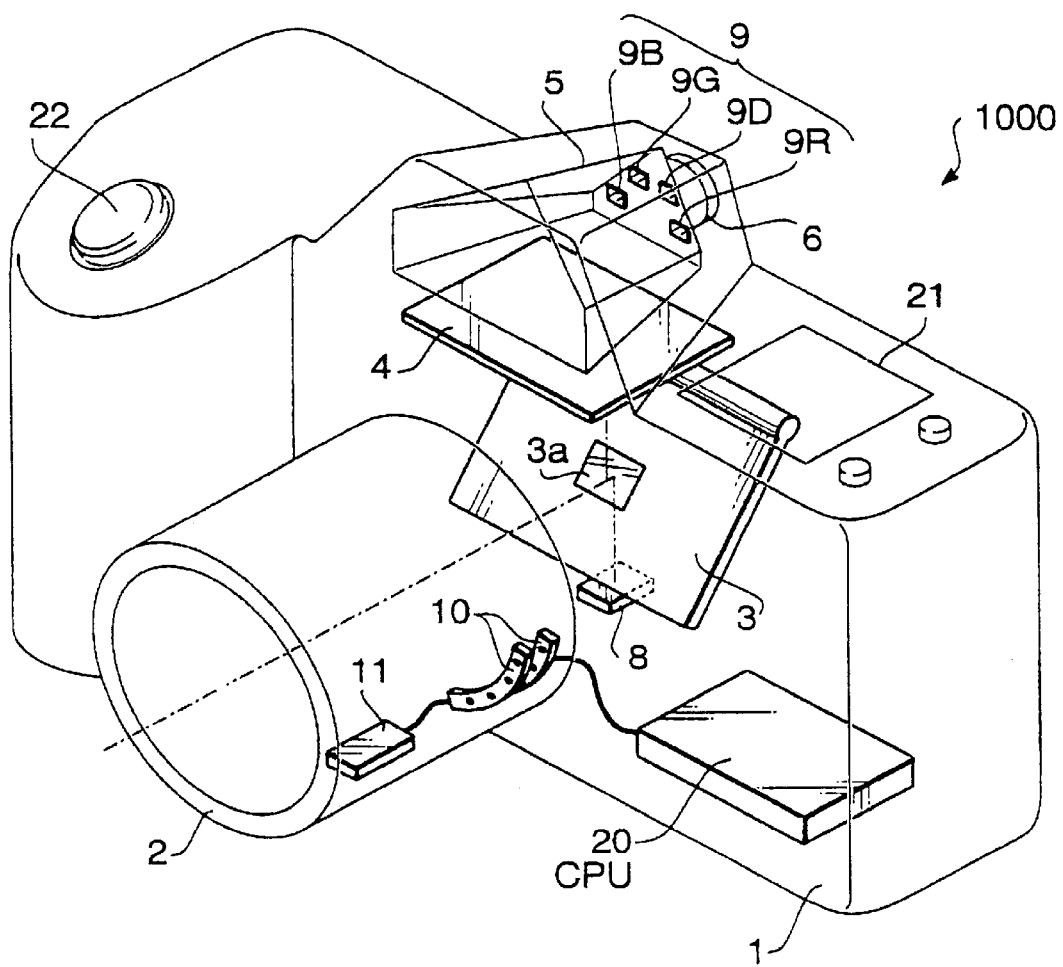
Figure 2:
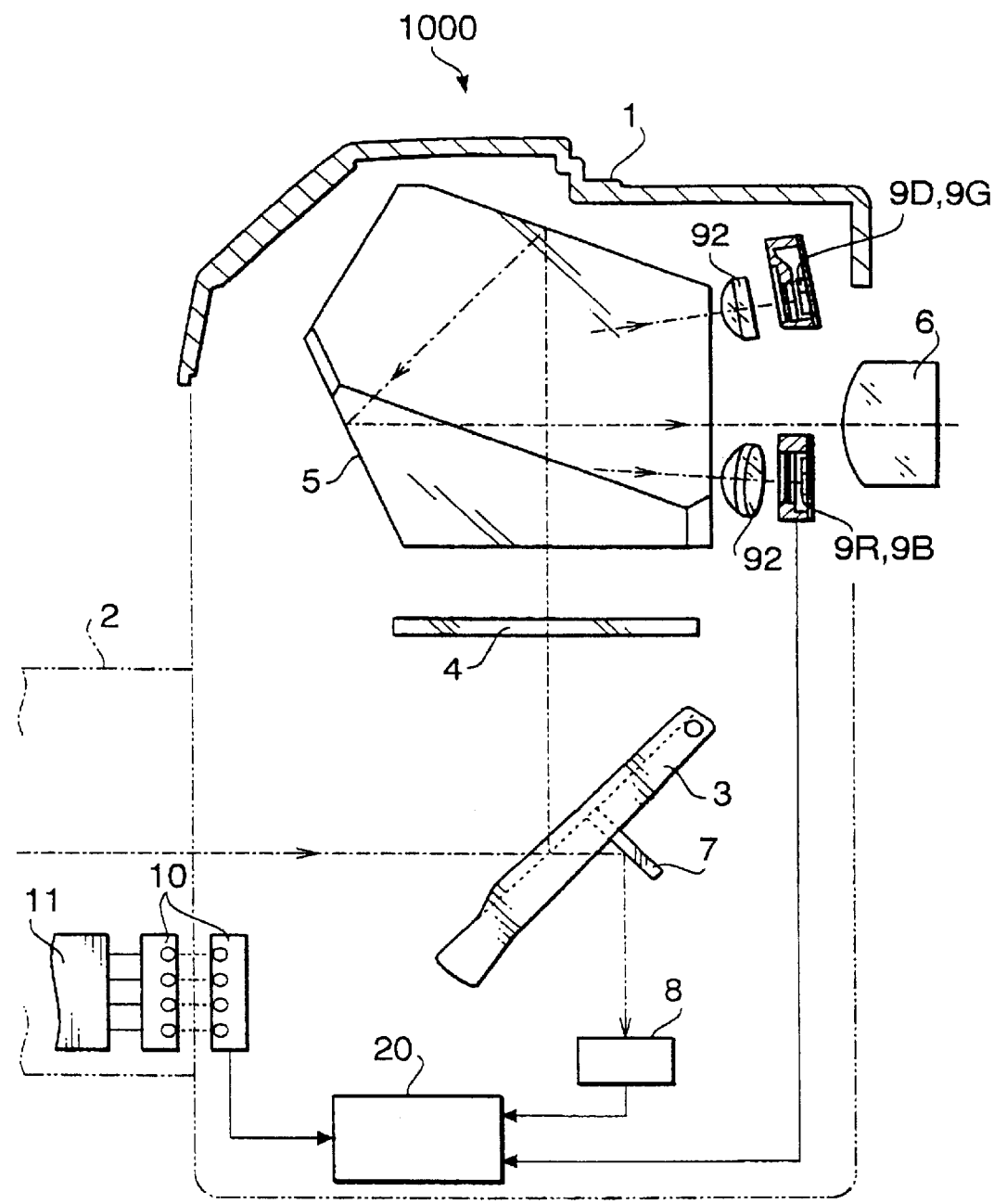

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a multi-point distance measuring device 8. The distance measuring device 8 is used for a multi-AF (Automatic focusing) control. Namely, using the multi-point distance measuring device 8, a plurality of distance measuring data are obtained at a plurality of distance measuring points and the distance measuring data corresponding to the plurality of distance measuring points is selected. Then, in accordance with the selected distance measuring data, AF control is performed. On the pentagonal prism 5, four photometry sensors 9 are provided, each of which functions as a photometry element and receives light passed through the photographing lens 2. Based on the outputs of the photometry sensors 4, a photometry operation for determining exposure parameters is executed. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of the simplicity.

Figure 3A:
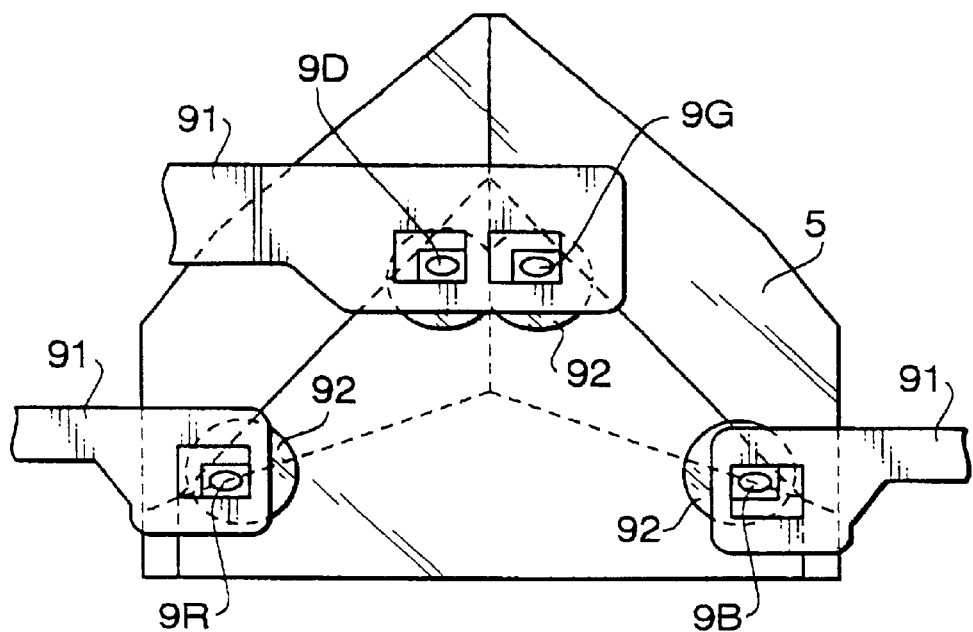
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collecting lens 92 is provide to form an object image on each of the sensors 9D, 9G, 9B and 9R.

FIG. 4A schematically shows a structure of each of the sensors 9D, 9G, 9B and 9R. As shown in FIG. 4A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship among the photometry areas A0–A5, portions of an object, and distance measuring points P0–P2. The photometry areas A0–A5 of each sensor receives the light from respective portions of an object as indicated in FIG. 4B. The photometry sensor 9G is provided with a green filter on its light receiving surface, and receives a green component of light, the photometry sensor 9B is provided with a blue filter on its light receiving surface, and receives ablue component of light, and the photometry sensor 9R is provided with a red filter on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters are indicated in FIG. 5. The spectral sensitivity of the sensors 9G, 9B and 9R respectively provided with the green, blue, and red filters have peaks, in sensitivity, at approximately 540 nm, 420 nm, and 620 nm, respectively. The remaining sensor 9D is not provided with a color filter, but a luminosity compensating filter is provided. The spectral sensitivity characteristic of the sensor provided with the luminosity compensating filter has its peak within a wavelength range of 500–600 nm. The sensor 9D is used as a normal light detecting sensor.

FIG. 6 shows a block diagram of main portions of the camera 1000. The four sensors 9D, 9G, 9B and 9R output values indicative of quantity of received light (components) to the controller 20, respectively. Further, the output (i.e., a distance value) of the distance measuring device 8 is output to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data.

It should be noted that the multi-point distance measuring device 8 detects distances at a plurality of points. According to the embodiment, the multi-point distance measuring device detects distances at points P0, P1 and P2 inside the areas A0, A1 and A2, respectively (see FIG. 4B). When the controller 20 performs the AF procedure described above, data representing the distances at point P0, P1 and P2 are stored in the RAM 27, and then, based on the data corresponding to the point(s) P0, P1 and/or P2 satisfying a certain condition, the photographing lens 2 is moved for focusing. For example, the closest one of the points P0, P1 and P2 is selected, or an intermediate one of the points P0, P1 and P2 is selected.

An operation of the photometry device will be described hereinafter.

FIG. 7 is a flowchart illustrating a main procedure of a photometry operation. When the release button 22 is half depressed and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open aperture value, a focal length of the photographing lens 2 and the like, which may affects the photometry calculation, intrinsic to the photographing lens 2. The data is input from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, quick return mirror 3, and the pentagonal prism 5. Then, the analog values are converted into digital brightness values Bvd which can be used in the operation at S20 executed by the controller 20. Then, based on the brightness value data Bvd obtained at S13 and the lens data intrinsic to the photographing lens 2 retrieved at S12, an "open aperture photometry compensation calculation procedure" is executed (S14) to compensate for errors depending on different photographing lenses.

At S15, an "exposure value calculation procedure" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light photographing, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components, a "colorimetry procedure" is executed to determine the color of the object, and then a calorimetric compensation value CC is calculated based on the determined color of the object. In S17, an "exposure value calorimetric compensation procedure" is executed, where the exposure value Lvd obtained at S15 is compensated based on the calorimetric compensation value CC.

At S18, if the shutter-release switch SWR is ON (S18: YES), the exposure control device 23 controls the exposure operation in accordance with the exposure value Lvd obtained at S17 to executed a photographing operation. If the shutter-release switch SWR is OFF, controls goes to S19, where it is detected whether a photometry timer is OFF.

If the photometry timer is ON (i.e., if a predetermined period has not elapsed) (S19: NO), control proceeds to S12, and the foregoing procedures are repeated. If the photometry timer is OFF (i.e., if the predetermined period has elapsed) (S19: YES), control proceeds to S11.

FIG. 8 is a flowchart illustrating the "lens communication procedure", which is called at S12 of the main procedure shown in FIG. 7.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open aperture and the aperture efficiency, and stores the data in the RAM 27.

FIG. 9 shows a flowchart illustrating the "photometry sensor Bvd calculation procedure", which is called as S13 in the main procedure shown in FIG. 7.

In this procedure, data Bvad(i) which represents A/D converted output voltages (analog data) of the photometry areas Ai (i=0, 1, ..., 5) shown in FIG. 4 of the photometry sensor 9D for normal light is obtained. Further, data Bvad·g (i), Bvad·b(i) and Bvad·r(i) which represent A/D converted values of the output voltages of the photometry areas Ai (i=0, 1, 2, ... 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·(i) are also adjusted to the brightness values Bvd·g(i), Bvd·b(i) and Bvd·.r(i), respectively (S112). It should be noted that the A/D conversion at steps S111 and S112 are well-know A/D conversion procedure, and the output voltage values (analog data) are converted into corresponding digital data.

FIG. 10 is a flowchart illustrating the "open aperture photometry compensation calculation procedure" which is called at S14 of the main procedure shown in FIG. 7.

At S121, an open aperture photometry compensation value Mnd1(i) is calculated based on the focal length, the exit pupil position, the open aperture and the aperture efficiency stored in the RAM 27. Compensation values mv1, mv2, mv3 and mv4 for compensating for shift amounts with respect to the reference photometry values due to the individual differences of the optical characteristics of the cameras, and due to the individual differences of the focal length, the exit pupil position, the open aperture and the aperture efficiency of each photographing lenses, are determined. Then, the sum of the compensation values mv1+mv2+mv3+mv4 is obtained, which is referred to as the open aperture compensation value Mnd1(i). Following the similar procedure, the open aperture compensation values Mnd1·g (i), Mnd1·b(i), and Mnd1·r are calculated. Then the open aperture compensation value Mnd1(i) is added to the brightness value Bvd(i), and then the sum is determined as a new brightness value Bvd(i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd·g(i)=Bvd·g(i)+Mnd1·g(i).$$

$$Bvd·b(i)=Bvd·b(i)+Mnd1·b(i).$$

$$Bvd·r(i)=Bvd·r(i)+Mnd1·r(i).$$

As a result, each brightness value is free from the affect of the individual differences of photographing lenses 2 when coupled to the camera body 1.

FIG. 11 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value are calculated at S131. Then, the upper brightness limit of a parameter is calculated (S132), compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

FIG. 12 is a flowchart illustrating a "colorimetry procedure" called at S16 of the main procedure.

In the "colorimetry procedure", the color of the object is detected, and a colorimetric compensation value CC is calculated in accordance with the detected color of the object.

At S21, colorimetric parameters are initialized (i.e., set to initial values). Depending on the color temperature of a light source illuminating the object, the calorimetric value varies. At S22, a "light source compensation procedure" is executed to obtain compensation values for the effects of the color temperature of the light source. At S23, a "light source compensation procedure" is executed using the compensation values obtained at S22. At S24, a "calorimetric parameter calculation procedure" for obtaining colorimetric parameters, which will be used for execution of a "colorimetric calculation procedure", is executed. At S25, a "colorimetric constant setting procedure" is executed to set constants used for color measurement. At S26, a "color judgment procedure" for judging a color based on the compensation values, parameters and constants obtained in the preceding steps is executed. At S27, an "area colorimetric compensation value calculating procedure" is executed for calculating colorimetric compensation values CC(i) for the photometry areas A0–A5 in accordance with the judged color. At S28, a CC calculating procedure for calculating a calorimetric compensation value CC for an entire object in accordance with the colorimetric compensation values CC(i) for the respective photometry areas is executed.

At S17 (see FIG. 7), the exposure value Lvd obtained at S15 is compensated based on the colorimetric compensation value CC as a whole to obtain a final exposure value Lvd. That is, the final exposure value Lvd is calculated by the formula below:

$$Lvd=Lvd+CC.$$

Next, steps S22–S28 shown in FIG. 12 will be described in further detail.

FIG. 13 is a flowchart illustrating the "light source compensation procedure" called at S22 of FIG. 12. In the embodiment, when the Bvd value of the photometry sensors 9 is set, a predetermined light source (i.e., light source A) for adjustment is used. When a photographing is to be executed, the Bvd should be compensated in accordance with the actually used light source, for example, the sun light. In the procedure shown in FIG. 13, relative compensation values of B (blue) and R (red) components with respect to the value for the green component are obtained.

Specifically, for the color components G, B and R, light source data Bvd·light·g, Bvd·light·b, Bvd·light·r is read form the EEPROM 26 of the controller 20 (S141). Then, a light source adjustment value adj·sun·b for the photometry sensor 9B and a light source adjustment value adj·sun·r for the photometry sensor 9R with respect to the value for G component are read from the EEPROM 26 (S142). In the embodiment, the light source adjustment values are as follows (S145).

$$adj{\cdot}sun{\cdot}b=+8$$

$$adj{\cdot}sun\ r=-4$$

It should be noted that, if the adjustment of the sensors 9 is executed using the sun light instead of the predetermined light source A, the light source adjustment values are all zero.

Then, based on the light source data and the light source adjustment values, a light source compensation value light.gb for the photometry sensor 9B is obtained as follows (S143).

$$light{\cdot}gb=Bvd{\cdot}light{\cdot}g{-}Bvd{\cdot}light{\cdot}b+adj{\cdot}sun{\cdot}b$$

Similarly, a light source compensation value light·gr for the photometry sensor 9R is obtained as follows (S144).

$$light{\cdot}gr=Bvd{\cdot}light{\cdot}g{-}Bvd{\cdot}light{\cdot}r+adj{\cdot}sun{\cdot}r$$

FIG. 14 is a flowchart illustrating the "light source compensation procedure", which is called at S23 in FIG. 12. In this procedure, based on the light source compensation values for B and R, obtained at S22, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd{\cdot}b(i)=Bvd{\cdot}b(i)+light{\cdot}gb$$

At S152, for each photometry area of the photometry sensor 9R, the following calculation is executed.

$$Bvd{\cdot}r(i)=Bvd{\cdot}r(i)+light{\cdot}gr$$

With the above compensation, the photometry sensors 9G, 9B and 9R has the same photometric characteristics for the sun light.

FIG. 15 is a flowchart illustrating the "calorimetric parameter calculation procedure", which is called at S24 of FIG. 12. In this procedure, colorimetric parameters used in the colorimetric judging are calculated. As the calorimetric parameters, parameters Gf(i) for G component, parameters Bf(i) for B component, and parameters Rf(i) for R component are calculated (S161, S162 and S163) according to the following formulae.

$$Gf(i)=Bvd{\cdot}g(i)-\{Bvd{\cdot}b(i)+Bvd{\cdot}r(i)\}/2;$$

$$Bf(i)=Bvd{\cdot}b(i)-\{Bvd{\cdot}g(i)+Bvd{\cdot}r(i)\}/2;$$

and $$Rf(i)=Bvd{\cdot}r(i)-\{Bvd{\cdot}b(i)+Bvd{\cdot}g(i)\}/2.$$

FIG. 16 is a flowchart illustrating the colorimetric constant setting procedure, in which the colorimetric constants are read from the EEPROM 26. The calorimetric constants include:

threshold values for color judgment: THvalue·*1(i);
coefficients for color judgment: coefficient·#1(i) and coefficient·#2(i);
coefficients for calculating colorimetric compensation values: CCcoefficient·*1(i);
adjustment values for calculating the calorimetric compensation values: CCadjestment·*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the calorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 17 shows an example of the constants read from the EEPROM 26.

FIGS. 18 and 19 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182: YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<| coefficient·g1(i)×Gf(i)| (S188:YES), Color19 min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color19 max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (Sl98). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i))×Bf(i)| are compared (S200).

If |Gf(i)−Rf(i)|<|coefficient·b1(i)×Bf(i)| (S200:YES), Color·min(i) is set to Bf(i) (S201). If Bf(i)>THvalue·y1(i)

(S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min (i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, Yellow has the highest priority, and in the foregoing steps, the color finally selected in accordance with the conditions is determined as the color of the photometry area.

FIG. 20 is a flowchart illustrating an example of the "area colorimetric compensation value calculating procedure", which is called at S27 of the main colorimetry procedure in FIG. 12.

In this procedure, the colorimetric compensation values CC(i) corresponding to the difference of the color among the photometry areas are calculated. In the example shown in FIG. 20, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), CC(i) is set to C (S226). If color(i) is not cyan (S225:NO), then step S226 is skipped. At S227, it is judged whether color(i) is magenta. If color(i) is magenta (S227:YES), CC(i) is set to M (S228). If color(i) is not magenta (S227:NO), then step S228 is skipped. At S229, it is judged whether color(i) is green. If color(i) is green (S229:YES), CC(i) is set to G(S230). If color(i) is not green (S229:NO), then step S230 is skipped. At S231, it is judged whether color(i) is blue. If color(i) is blue (S231:YES), CC(i) is set to B (S232). If color(i) is not blue (S231:NO), then step S232 is skipped. At S233, it is judged whether color(i) is red. If color(i) is red (S233:YES), CC(i) is set to R (S234). If color(i) is not red (S233:NO), then step S234 is skipped. At S235, it is judged whether color(i) is yellow. If color(i) is yellow (S235:YES), CC(i) is set to Y (S236). If color(i) is not yellow (S235:NO), then step S236 is skipped. Then, at S237, i is incremented by one, and control returns to S222.

FIG. 21 shows a table in which the relationship between the compensation value CC(i) determined in the procedure shown in FIG. 20 and the actual compensation values is indicated.

FIG. 22 is a flowchart illustrating a "CC calculating procedure", which is called at S28 of the main colorimetry procedure in FIG. 12.

At S251, the controller 20 identifies the point(s) selected for AF operation. As afore-mentioned, the point corresponding to the closest distance maybe selected. Alternatively, the point corresponding to the intermediate distance may be selected, or various algorithms may be adapted for selecting the distance measuring point(s). At S251, selected one of the points P0, P1 or P2 is identified as distance measuring point data. Then, in accordance with the color metric compensation value CC(i) for each photometry area and the distance measuring point data, a calorimetric compensation value CC is calculated (S252).

Two methods for calculating the colorimetric compensation value CC will be described below.

In a first method, the colorimetric compensation value CC(i) for the area corresponding to the distance measuring point data is used as the calorimetric compensation value CC. For example, if point P0 is selected for focusing the photographing lens 2, the colorimetric compensation value CC(0) for the area A0 is used as the colorimetric compensation value CC.

In an alternative method, weighted-averaging may be performed. That is, the colorimetric compensation values CC(i) for the area(s) corresponding to the distance measuring point data or closer thereto are assigned with relatively large weighting factors, while the colorimetric compensation values CC(i) for the other areas are assigned with relatively small numbers, and the weighted-averaging is performed. For example, if point P0 is selected for AF operation and identified as the distance measuring point data, area A0 including the point P0 may be assigned with a large weighting factor, and the calorimetric compensation value CC may be calculated in accordance with the formula below.

$$CC=\{CC(0)\times 4+(CC(1)+CC(2)+CC(3)+CC(4))\times 3/4\}/7$$

As above, in the colorimetry procedure, the colorimetric compensation value CC can be obtained. Using the compensation value CC, the exposure value Lvd is compensated to obtain the final (i.e., compensated) exposure value Lvd.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue or red, the exposure compensation value is determined to decrease the exposure value·With this configuration, errors in determining the exposure value when such objects are photographed, which has been desired to be solved, can be resolved. Furthermore, exposure compensation amounts is determined based on a color or colors of the divided photometry area or areas including a distance measuring point or points at which main object to be photographed is focused, so it is possible to photograph a main object at a suitable exposure value·

FIG. 23 shows an alternative configuration of the divided photometry areas A00–A05, which can be employed instead of the configuration shown in FIG. 4B. In this modification, a field of view is divided into 2×3 photometry areas having the same rectangular shape. In this modification, the distance measuring points P1 and P2 are included in the photometry areas A00 and A01, respectively, while, the distance measuring point P0 is located between the areas A00 and A01. In this case, if the AF operation is executed in relation to the point P0, the above-described alternative method for obtaining the calorimetric compensation value CC may be used. If the AF operation is executed in relation to the point P1 or P2, the above-described first method for obtaining the colorimetric compensation value CC may be used. Alternatively, weighted-averaging may be performed by assigning a relatively large weight to the area A00 or A01 including the selected point P1 or P2.

In the first embodiment, as shown in FIG. 3A, the sensor 9D for the normal light is provided at the upper central portion on the eyepiece optical system side of the pentagonal prism 5. Therefore, with respect to the object, the sensor 9D is located at the central portion in the right-and-left direction. With this structure, if the sensor 9D has a symmetrical sensitivity distribution in the right-and-left direction, the brightness of the central portion of the object can be measured at high accuracy. That is, at the central portion of the pentagonal prism 5, an angle formed between the optical axis of the photographing lens 2 and the optical axis of the eyepiece optical system 6 of the pentagonal prism 5 can be made relatively small, and therefore, the sensor 9D covers substantially all the photographing angle of the object.

Figure 3B:
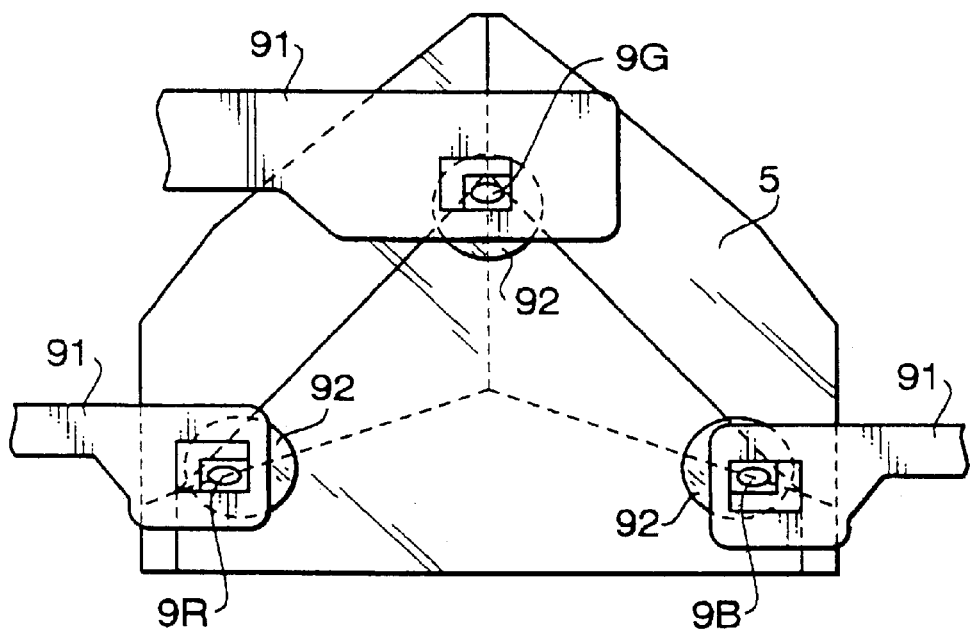
FIG. 3B shows an alternative arrangement of photometry sensors.

In the embodiment described above, the sensor 9D for the normal light is provided besides the sensors 9B, 9G and 9R for B, G and R color components. The light receiving characteristics of the sensor G has a peak at the wavelength of 540 nm. This characteristic is close to that of the sensor 9D. Therefore, the sensor 9G is used instead of the sensor 9D, and the sensor 9D is omitted, as shown in FIG. 3B. In such a case, in steps S11–S15 of the main procedure (FIG. 7), the output Bvad·g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

The present disclosure relates to the subject matters contained in Japanese Patent Applications No. HEI 11-349984, filed on Dec. 9, 1999, No. 2000-235356, filed on Aug. 3, 2000, which are expressly incorporated herein by reference in their entireties.

What is claimed is:

1. A photometry device for a camera, comprising:
   a normal light metering system having spectral sensitivity characteristics close to visual sensitivity characteristics;
   a plurality of light metering systems having spectral sensitivity characteristics that are different from those of said normal light metering system;
   an exposure amount determining system that determines an exposure amount of an object in accordance with an output of said normal light metering system;
   a colorimetry system that judges a color of the object in accordance with the outputs of said plurality of light metering systems;
   a compensation amount determining system that determines an exposure compensation amount in accordance with the color judged by said colorimetry system;
   said colorimetry system dividing a photometry area into a plurality of areas and performing colorimetry for each of said plurality of areas,
   said compensation amount determining system determining a plurality of exposure compensation amounts respectively corresponding to said plurality of areas, one of the plurality of exposure compensation amounts being selected in accordance with at least one of said plurality of areas corresponding to a focused portion of the object, and
   a controller that compensates for the exposure amount determined by said exposure amount determining system in accordance with the determined exposure compensation amount.

2. The photometry device according to claim 1, wherein said camera comprises:
   a distance measuring system that detects distances of an object at a plurality of distance measuring points corresponding to said divided plurality of areas of said photometry area; and
   a focusing system that focuses on one of said plurality of distance measuring points,
      wherein said compensation amount determining system selects the exposure compensation amount corresponding to an area in said divided areas of said photometry area including at least one of said plurality of distance measuring points.

3. The photometry device according to claim 2, wherein said plurality of light metering systems are arranged on an eyepiece optical system side of a pentagonal prism of an single lens reflex camera, photometry area of each of said plurality of light metering system covering a photographing angle of view of said single lens reflex camera, and wherein said plurality of distance measuring points are arranged inside said photographing angle of view of said single lens reflex camera.

4. The photometry system according to claim 3, wherein at least one of said divided areas of said photometry area includes one of said plurality of distance measuring points.

5. The photometry device according to claim 1, wherein said camera comprises:
   a distance measuring system that detects distances of an object at a plurality of distance measuring points respectively corresponding to said divided areas of said photometry area; and
   a focusing system that focuses on one of said plurality of distance measuring points,
      wherein said compensation amount determining system determines an entire exposure compensation amount based on at least one of the exposure compensation amounts corresponding to at least one of said divided areas of the photometry area close to one of said distance measuring points and another exposure compensation amount corresponding to another of said divided areas.

6. The photometry device according to claim 5, wherein said compensation amount determining system determines said entire exposure compensation amount by averaging said exposure compensation amounts and said another exposure compensation amounts.

7. The photometry system according to claim 6, wherein at least one of said divided areas of said photometry area includes at least one of said a plurality of distance measuring points.

8. The photometry device according to claim 1, wherein said colorimetric system includes:
   a blue light photometry sensor that meters blue light:
   a green light photometry sensor that meters green light; and
   a red light photometry sensor that meters red light.

9. The photometry device according to claim 1, wherein said colorimetry system judges at least yellow, blue and red from among yellow, magenta, cyan, blue, green and red, in accordance with the outputs of said plurality of photometry sensors, and wherein said compensation amount determining system determines the exposure compensation amount in an over exposure side if the colorimetry system judges the color is yellow, and wherein said compensation amount determining system determines the exposure compensation amount in an under exposure side if the colorimetry system judges the color is blue or red.

10. The photometry device according to claim 9, wherein said compensation amount determining system determines the compensation amount is zero if the colorimetry system judges the color is magenta, cyan or green.

11. The photometry device for a camera according to claim 1, at least one of said plurality of areas being distinct from a distance measuring point of a distance measuring system of the camera.

12. The photometry device according to claim 5, wherein said compensation amount determining system determines said entire exposure compensation amount based upon assigning a first weighing value to an exposure compensation amount corresponding to one of said divided areas of the photometry area close to one of said distance measuring points and assigning a second weighing value to another exposure compensation amount corresponding to another of said divided areas, said first weighing amount being larger than said second weighing amount.

13. A photometry device for a camera, comprising:

a plurality of light metering systems having predetermined spectral sensitivity characteristics;

an exposure amount determining system that determines an exposure amount of an object;

a colorimetry system that determines a color of the object in accordance with outputs of said plurality of light metering systems;

a compensation amount determining system that determines an exposure compensation amount is accordance with the color judged by said colorimetry system;

said colorimetry system dividing a photometry area into a plurality of areas and performing colorimetry to judge a color of the object for each of said plurality of areas, said compensation amount determining system determining the exposure compensation amounts corresponding to said plurality of areas, one of the plurality of exposure compensation amounts being selected in accordance with at least one of said plurality of areas corresponding to a focus position of the object, and a controller that compensates for the exposure amount determined by said exposure amount determining system in accordance with the determined exposure compensation amount.

* * * * *